Feb. 7, 1933.  J. C. McCLELLAND  1,896,365
RECEPTACLE FOR LUMINESCENT DISCHARGE TUBES
Filed April 23, 1930
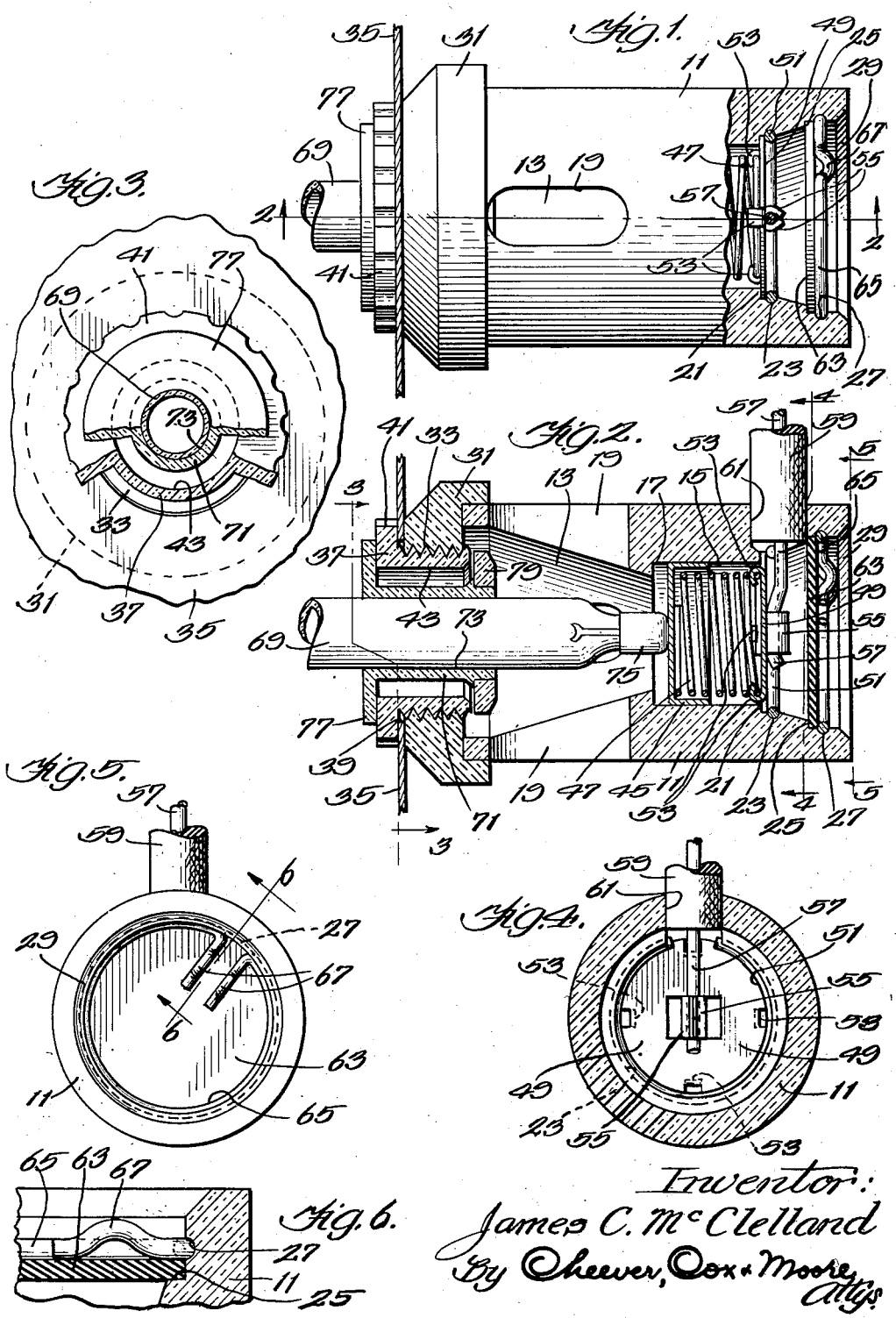
Inventor:
James C. McClelland
By Cheever, Cox & Moore
Attys.

Patented Feb. 7, 1933

1,896,365

UNITED STATES PATENT OFFICE

JAMES C. McCLELLAND, OF CHICAGO, ILLINOIS, ASSIGNOR TO FEDERAL ELECTRIC COMPANY, OF CHICAGO, ILLINOIS, A CORPORATION OF NEW YORK

RECEPTACLE FOR LUMINESCENT DISCHARGE TUBES

Application filed April 23, 1930. Serial No. 446,766.

My invention relates to receptacles and has more particular reference to receptacles for receiving and connecting the ends of luminescent discharge tubes into an electrical circuit.

Tubes of this general type are made of fragile material and are usually mounted on a panel and have their ends bent and pass through openings in the panel to permit attachment to an electric circuit rearwardly of the panel, as it is not practical to make the luminescent exactly to fit the panel on which it is to be mounted, and also because an accurately fitted tube is likely to be broken by any jar or jolt to which the panel may be subjected. The openings in the panel through which the ends of the tubes are carried, are customarily made considerably larger than the ends of the tube so that there is an annular aperture through the panel around the tube when the same is assembled in position. This aperture provides an opening through which moisture and insects may and do penetrate into the connection receptacle behind the panel in which the high voltage connection for the tube is made with the power circuit. The luminescent tube attracts myriads of insects to the front of the support panel whence a great number crawl through the apertures aforesaid and soon fill up the connection receptacle. The closely packed bodies of the insects cause short circuits, grounded circuits and similar disorders which of course are only augmented if and when rain or other forms of moisture penetrates behind the panel.

One object of my invention is to provide a receptacle for attachment behind a panel which will effectively close the opening in the panel through which the tube penetrates behind the panel without restricting the end of the tube to a predetermined position in the aperture and without clamping the fragile end of the tube to the panel.

Another object is to provide an adjustable receptacle in which the end of a luminescent tube may align itself when assembled to the support panel.

Another object is to provide a novel method of closing an opening in a receptacle which consists in forming an annular shoulder in the opening, mounting a disc in the opening and retaining the disc in place by means of a demountable key member which takes into a groove formed adjacent the shoulder.

These and other objects will be apparent as the invention is more fully understood from the following description, which taken in connection with the accompanying drawing discloses a preferred embodiment of my invention.

Referring to the drawing:

Figure 1 is a fragmentary view of a support panel for luminescent discharge tubes having a receptacle embodying my present invention mounted in operative position therein;

Figure 2 is a cross section taken substantially along the line 2—2 of Figure 1;

Figure 3 is a cross section taken substantially along the line 3—3 in Figure 2;

Figure 4 is a cross section taken substantially along the line 4—4 in Figure 2;

Figure 5 is an end view of the assembly illustrated in Figures 1 and 2; and

Figure 6 is a cross section taken substantially along the line 6—6 in Figure 5.

My invention comprises a receptacle for receiving the end of a luminescent discharge tube behind its support panel, and as illustrated in the accompanying drawing comprises a cylindrical housing 11, which may be formed of any convenient insulating material, such as porcelain. The housing 11 is provided with an axial bore or channel, which at the forward end of the housing is of substantially large diameter. Inwardly of the forward end, the bore has sloping sides forming a chamber 13 shaped substantially as a truncated cone. The inner or smaller end of the chamber 13 communicates with a cylindrical chamber 15 of slightly larger diameter than the inner or small end of the chamber 13, thereby providing a shoulder 17 at the junction of these chambers. The housing 11 is provided with oval shaped lateral openings 19, which provide communication between the chamber 13 and the outside of the housing 11. Rearwardly of the chamber 15, the axial bore of the housing 11 increases in diameter to provide a shoulder 21, a lateral groove 23 adjacent the shoulder 21. A second shoulder 25 and a second annular groove 27 adjacent the shoulder 25. Rearwardly of the groove 27, the bore of the housing 11 is beveled as at 29 and opens at the back of the housing.

The forward end of the housing 11 is provided with an annular collar 31, having a central threaded bore 33 communicating with the forward or larger end of the chamber 13. The front face of this collar 31 is adapted to engage the rear surface of the support panel 35 to which the luminescent tube is to be mounted, and a flanged nut 37 is threaded into the bore 33 of the collar from the front of the panel through a perforation 39 therein, the nut 37 having a flanged portion 41 which overhangs the edge of the perforation 39, whereby to clamp the panel between the collar 31 and the nut 37, in order to support the receptacle in place. The nut 37 has a smooth internal channel 43 extending therethrough and communicating from the front of the panel into the chamber 13.

A depressible electrical contact making mechanism is assembled in the chamber 15 and consists of a circular cup shaped member 45 arranged for longitudinal movement in the chamber 15, the member 45 having upstanding flanges adapted to ride along the cylindrical walls of the chamber 15. The cup shaped member 45 normally rests upon the shoulder 17 formed in the junction of the chamber 13 and the chamber 14. The cup shaped member 45 is normally pressed against the shoulder 17 by means of a spring 47, which is arranged in the chamber 15 and has end pressing against the cup shaped member 45, while its other end is secured to a disc like member 49. The marginal portions of which rest against the shoulder 21 at the rear end of the chamber 14, the disc 49 being held in place by a friction key member 51 comprising a wire of circular cross section which may be sprung into the annular groove 23 behind the disc 49. The disc 49 may, if desired, be provided with struck out portions at points in its margin said portions being curled inwardly and wrapped around the end of the spring 47, in order to secure the same to the disc 49. The disc is also provided with ears 55, which are struck outwardly thereof and between which the end 57 of a high tension cable conductor 59 may be crimped. The housing 11 is provided with a radial perforation 61 through which the cable extends from its point of contact with the disc 47 outwardly of the casing to a source of electrical potential.

In order to close the open end of the housing 11, a disc 63 of any convenient insulating material, such as porcelain, fibre or the like is arranged with its marginal edges engaging the shoulder 25 of the housing, and this disc is retained in place by means of a readily detachable key member 65, comprising a length of wire bent to circular shape for arrangement in the annular groove 27 formed in the housing adjacent the shoulder 25. The ends 67 of the key member 65 are or may be bent inwardly and curving to form means for contracting the key member in order to release it from the groove 27 when it is desired to remove the closure disc 63.

The end of a luminescent tube 69 may be supported and secured in the receptacle through the bore 43 of the retaining nut 37, and in order to permit the tube 69 to align itself within the receptacle, the retaining nut 37 is provided with a support collar 71, shiftably mounted within the bore 43 of the nut 37. This collar is provided with a central bore 73 of a size to receive the end of the tube 69, which may thus extend through the collar 71 and engage the depressible contact member 45 at its inner end 75, which may be provided with any suitable contact device for the purpose of forming an electrical connection between the end 75 of the tube 69 and the depressible contact member 45. The shiftable collar 71 is provided with an external flange 77, which overlies the inner edge of the nut 37, the flanges 77 and 79 are of course to prevent axial movement of the collar 71 with respect to the nut 37, although as will be clearly apparent, the collar 71 may be moved radially with respect to the nut 37, to thus permit it to assume any desired eccentric position within the diametral limits of the bore 43.

I prefer to form the several parts of the assembly of insulating material, save of course the contact making parts 45, 57, 59 and the cable 57, and these insulating parts are preferably formed of porcelain. In order to assemble the collar 71 within the bore 43 of the retaining nut 37, it is necessary to make this member of two parts and the inner flange 79 is therefore preferably formed as a washer, which may be cemented to the inner end of the collar 71 after the cylindrical body of the same has been inserted through the bore 43.

The forward flange 77 of the collar 71 is wide enough to cover the forward opening of the bore 43 in all eccentric positions of the collar with respect to the nut 37, and so after the device has been assembled on the panel, there will be no aperture by which moisture or insects, or other foreign matter may pass from in front of the panel and into the chamber 13 of the housing. Inasmuch as the collar 71 may assume any eccentric position dictated by the configuration of the tube 69, it will be obvious that the tube will not have to be accurately bent in order to register exactly with the pre-determined position of the receptacle. Since the collar 71 also is freely and radially shiftable within the nut 37, strains imparted to the luminescent member due to the relative shifting of the parts of the receptacle or the frame are limited.

It is thought that the invention and numerous of its attendant advantages will be understood from the foregoing description and it is obvious that numerous changes may be made in the form, construction and arrangement of the several parts without departing from the spirit or scope of my invention, and without sacrificing any of its attendant advantages, the form hereinbefore described being of a preferred embodiment for the purpose of illustrating my invention.

Having thus described my invention what I claim as new and desire to secure by Letters Patent is:

1. In a device of the class described for mounting an electric circuit in a panel having a perforation, a housing adapted to be mounted on the panel and extending rearwardly of the perforation to receive a portion of the unit to be supported extending rearwardly through said opening and into said housing, a conductor comprising a disc resiliently mounted in said housing in position to yieldingly engage the inner end of said portion, means connecting said conductor to a source of electrical power, and a collar for embracing the said portion and mounted in said opening for free movement rearwardly therein, said collar having a flange covering said opening to prevent the penetration of foreign matter into the housing.

2. In a device of the class described for mounting an electric unit in a panel having a perforation, a housing adapted to be mounted on the panel and extending rearwardly of the perforation, said housing having a forward internally threaded portion provided with a surface for engaging the panel adjacent the perforation, a nut threaded into the threaded portion of the housing and having an outwardly extending flange for engaging the forward surface of the panel to clampingly secure the housing thereto, said nut being provided with a channel communicating with the interior of the housing and a collar loosely mounted in said channel for radial movement with respect to the nut, said collar having a flange covering the forward end of said channel and having a central opening to permit a portion of the supported unit to extend therethrough and into the housing.

3. In a device of the class described for mounting an electric unit in a panel having a perforation, a housing adapted to be mounted on the panel and extending rearwardly of the perforation, said housing having a forward internally threaded portion provided with a surface for engaging the panel adjacent the perforation, a nut threaded into the threaded portion of the housing and having an outwardly extending flange for engaging the forward surface of the panel to clampingly secure the housing thereto, said nut being provided with a channel communicating with the interior of the housing and a collar loosely mounted in said channel for radial movement with respect to the nut, said collar having a flange covering the forward end of said channel and having a central opening to permit a portion of the supported unit to extend therethrough and into the housing, said housing being provided internally with an annular shoulder, a conductor comprising a disc engaging said shoulder at its marginal portions, spring means extending behind said disc to normally urge the same against said annular shoulder and means for connecting said conductor with a source of electrical power.

4. In a device of the class described for mounting an electrical unit in a panel having a perforation, a housing adapted to be mounted on the panel and extending rearwardly of the perforation, said housing having a forward internally threaded portion provided with a surface for engaging the panel adjacent the perforation, a nut threaded into the threaded portion of the housing and having an outwardly extending flange for engaging the forward surface of the panel to clampingly secure the housing thereto, said nut being provided with a channel communicating with the interior of the housing and a collar loosely mounted in said channel for radial movement with respect to the nut, said collar having a flange covering the forward end of said channel and having a central opening to permit a portion of the supported unit to extend therethrough and into the housing, said housing being provided internally with an annular shoulder, a conductor comprising a disc engaging said shoulder at its marginal portions, spring means extending behind said disc to normally urge the same against said annular shoulder and means for connecting said conductor with a source of electrical power, said housing having a lateral opening, a conductor extending through said opening and connected at its inner end with said disc through said spring means.

5. In a device of the class described, a receptacle comprising a housing provided with a central bore, said bore being formed to provide a chamber at the front of the receptacle, a second chamber rearwardly of said first chamber and communicating therewith, the internal walls of said housing being formed to define a shoulder at the junction of said chambers, a disc-like conductor seated against said shoulder, a second shoulder formed in the inner walls of the housing at a point spaced from said first mentioned shoulder, a disc-like conductor seated against said shoulder, means to retain said disc in place, spring means extending between the first mentioned and second mentioned disc to yieldingly urge the first mentioned disc against its shoulder, a cable entering the housing adjacent said second disc and connected thereto, and an end closure for the bore comprising a disc of insulating material seated in an annular shoulder formed in the housing near the open end thereof and means to retain the disc in place, said retaining means comprising a curved ring of resilient material adapted to engage an annular groove formed in the walls of the housing adjacent said disc.

In witness whereof, I have hereunto subscribed my name.

JAMES C. McCLELLAND.